(12) United States Patent
Tozawa et al.

(10) Patent No.: US 7,895,886 B2
(45) Date of Patent: Mar. 1, 2011

(54) EVALUATION METHOD FOR PNEUMATIC TIRES AND SYSTEM THEREOF

(75) Inventors: Yukio Tozawa, Kanagawa (JP); Kazuhiro Shimura, Kanagawa (JP); Hiroshi Iizuka, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 424 days.

(21) Appl. No.: 12/158,977

(22) PCT Filed: Jan. 29, 2007

(86) PCT No.: PCT/JP2007/051376
§ 371 (c)(1),
(2), (4) Date: Jun. 23, 2008

(87) PCT Pub. No.: WO2007/086556
PCT Pub. Date: Aug. 2, 2007

(65) Prior Publication Data
US 2010/0132445 A1  Jun. 3, 2010

(30) Foreign Application Priority Data
Jan. 30, 2006  (JP) .............................. 2006-020051

(51) Int. Cl.
*G01M 17/02* (2006.01)
(52) U.S. Cl. .......................................... 73/146; 702/99
(58) Field of Classification Search ...................... None
See application file for complete search history.

(56) References Cited

U.S. PATENT DOCUMENTS 7,043,973 B2 * 5/2006 Shepherd et al. .............. 73/146
7,111,507 B2 * 9/2006 Fennel et al. ............... 73/146.4
7,209,855 B2 * 4/2007 Fabre et al. ................. 702/138
7,391,307 B2 * 6/2008 Kuwajima .................. 340/442

(Continued)

FOREIGN PATENT DOCUMENTS

JP  07-214629 A  8/1995

(Continued)

OTHER PUBLICATIONS

International Search Report for PCT/JP2007/501376 dated Mar. 8, 2007.

*Primary Examiner*—Lisa M Caputo
*Assistant Examiner*—Jermaine Jenkins
(74) *Attorney, Agent, or Firm*—Knobbe Martens Olson & Bear, LLP

(57) ABSTRACT

An evaluation method for pneumatic tires and a system thereof, is provided, capable of appropriately evaluating an adverse effect, such as deterioration, of tire temperature by expressing severity of a temperature imposed on a member of tire made of rubber or the like in quantitative and convenient manners. Detection counts are calculated for each detected temperature according to a detection counts calculating unit 102 based on information of temperatures of pneumatic tires detected by a temperature sensor of a temperature detector 101. Temperature severity numbers of the pneumatic tires are calculated from a computing equation by a severity calculating unit 104 based on the detection counts and contribution coefficients of deterioration of tire rubber with temperatures stored in a contribution coefficient storage 103 as parameters. Using the calculated temperature severity number, a determination unit 105 determines thermal deterioration of the tire.

15 Claims, 6 Drawing Sheets

U.S. PATENT DOCUMENTS 7,421,321 B2 * 9/2008 Breed et al. .................. 701/29

FOREIGN PATENT DOCUMENTS

| | | |
|---|---|---|
| JP | 09-509488 A | 9/1997 |
| JP | 2002-317615 A | 10/2002 |
| JP | 2003-511287 A | 3/2003 |
| JP | 2005-047295 A | 2/2005 |
| JP | 2005-227141 A | 8/2005 |
| WO | WO 2003-100370 A | 5/2003 |

* cited by examiner

Fig. 4

| temperature | detection rate | contribution coefficient | zone TSN |
|---|---|---|---|
| 2 | 0.0000 | 0.0086 | 0.00000 |
| 4 | 0.0000 | 0.0099 | 0.00000 |
| 6 | 0.0000 | 0.0113 | 0.00000 |
| 8 | 0.0000 | 0.0130 | 0.00000 |
| 10 | 0.0185 | 0.0150 | 0.00278 |
| 12 | 0.0556 | 0.0172 | 0.01150 |
| 14 | 0.0556 | 0.0198 | 0.01543 |
| 16 | 0.0556 | 0.0228 | 0.02029 |
| 18 | 0.0370 | 0.0263 | 0.01750 |
| 20 | 0.0370 | 0.0302 | 0.02237 |
| 22 | 0.0370 | 0.0347 | 0.02830 |
| 24 | 0.1296 | 0.0400 | 0.12430 |
| 26 | 0.0556 | 0.0460 | 0.06639 |
| 28 | 0.0370 | 0.0529 | 0.05482 |
| 30 | 0.0741 | 0.0608 | 0.13513 |
| 32 | 0.0370 | 0.0699 | 0.08290 |
| 34 | 0.0185 | 0.0805 | 0.05066 |
| 36 | 0.0556 | 0.0926 | 0.18510 |
| 38 | 0.0370 | 0.1065 | 0.14983 |
| 40 | 0.0370 | 0.1225 | 0.18142 |
| 42 | 0.0556 | 0.1409 | 0.32867 |
| 44 | 0.0370 | 0.1620 | 0.26404 |
| 46 | 0.0556 | 0.1864 | 0.47629 |
| 48 | 0.0556 | 0.2144 | 0.57168 |
| 50 | 0.0185 | 0.2466 | 0.22833 |
| 52 | 0.0000 | 0.2837 | 0.00000 |
| 54 | 0.0000 | 0.3263 | 0.00000 |
| 56 | 0.0000 | 0.3753 | 0.00000 |
| 58 | 0.0000 | 0.4317 | 0.00000 |
| 60 | 0.0000 | 0.4966 | 0.00000 |
| 62 | 0.0000 | 0.5712 | 0.00000 |
| 64 | 0.0000 | 0.6570 | 0.00000 |
| 66 | 0.0000 | 0.7558 | 0.00000 |
| 68 | 0.0000 | 0.8694 | 0.00000 |
| 70 | 0.0000 | 1.0000 | 0.00000 |
| 72 | 0.0000 | 1.1503 | 0.00000 |
| 74 | 0.0000 | 1.3231 | 0.00000 |
| 76 | 0.0000 | 1.5220 | 0.00000 |
| 78 | 0.0000 | 1.7507 | 0.00000 |
| 80 | 0.0000 | 2.0138 | 0.00000 |
| 82 | 0.0000 | 2.3164 | 0.00000 |
| 84 | 0.0000 | 2.6645 | 0.00000 |
| 86 | 0.0000 | 3.0649 | 0.00000 |
| 88 | 0.0000 | 3.5254 | 0.00000 |
| 90 | 0.0000 | 4.0552 | 0.00000 |
| | | TSN | 0.3018 |

EVALUATION METHOD FOR PNEUMATIC TIRES AND SYSTEM THEREOF

BACKGROUND OF THE INVENTION

1. Field of the Invention

The present invention relates to an evaluation method for pneumatic tires and a system thereof, for evaluating an adverse effect of a temperature of a pneumatic tire, such as deterioration.

2. Description of the Related Art

Conventionally, as a method or a device for evaluating deterioration of a pneumatic tire, for example, there are known a method for estimating a secular change of tire disclosed in Japanese Patent Publication No. 2005-47295 (Patent Document 1), a tire heat deterioration detection sensor disclosed in PCT Patent Publication No. WO2003-100370 (Patent Document 2) and a vehicular diagnostic system disclosed in Japanese Patent Publication No. 2005-227141 (Patent Document 3).

The method for estimating a secular change of a tire disclosed in Patent Document 1 defines a tire model formed by dividing a tire into many elements and a model of energy (including thermal energy and elapsed time) applied to the tire model, performs stress calculation including breakdown parameters and drag calculation for destructive force and estimates tire secular changes (lifetime) based on physical quantities of these calculation results. This method provides estimation of tire secular change performance by a comparison between tire breakdown parameters and drag, thus making an analysis according to tire usage.

The tire heat deterioration detection sensor disclosed in Patent Document 2 includes a magnetic circuit constituting body which is mounted at a required portion of a tire and forms a closed magnetic circuit and a magnetic sensor for detecting a leaking magnetic field from the magnetic circuit constituting body, and has such properties that the leaking magnetic field increases when a temperature of the magnetic circuit constituting body rises or heat deterioration advances.

According to such a tire heat deterioration detection sensor, the magnetic sensor for detecting a leaking magnetic field from the magnetic circuit constituting body mounted at a required portion of a tire or detecting a magnetic field from a composite magnet is configured so as to detect a change in the magnetic characteristics of the magnetic circuit constituting body or the composite magnet and to change magnetic characteristics of the magnetic circuit constituting body or the composite magnet, depending on the magnitude of temperature or heat deterioration of a required portion of a tire. This makes it possible to grasp the magnitude of a temperature or heat deterioration of a required tire portion from a magnetic flux density detected by the magnetic sensor and to detect excessive magnitude of temperature or heat deterioration, thus warning a driver of the abnormal state for safe vehicle driving.

The vehicular diagnostic system disclosed in Patent Document 3 is a system which diagnoses deterioration or abrasion of vehicle consumables including tires and displays the diagnostic results on a screen of an on-vehicle display. Data to be collected includes tire average temperatures and tire maximum temperatures in one-day driving.

This system does not simply display diagnostic results of vehicle consumables on the screen nor simply display the driving behaviors of a driver on a screen, but includes the driving behaviors in the diagnostic elements for the magnitude of abrasion for display on a screen, thus attaining intuitive grasping for economical and safety driving by correlating the diagnostic results of vehicle consumables with the driving behaviors.

Patent Document 1: Japanese Patent Publication No. 2005-47295

Patent Document 2: PCT Patent Publication No. WO2003-100370

Patent Document 3: Japanese Patent Publication No. 2005-227141

SUMMARY OF THE INVENTION

Problems to be Solved by the Invention

A key factor in evaluating a state change such as deterioration of a pneumatic tire is a temperature change in a tire member such as rubber, and the method and the device described above will not quantitatively and conventionally indicate the severity of temperatures applied to the tire member and have the following problem: it is difficult to objectively grasp adverse effects of tire temperature changes, such as deterioration, by comparing the effects with each other.

In view of the aforementioned problems, it is an object of the present invention to provide an evaluation method for pneumatic tires and a system thereof, capable of evaluating positively an adverse effect of a tire temperature, such as deterioration, by quantitatively and conveniently indicating the severity of a temperature applied to a tire member made of rubber.

Means for Solving the Problems

To attain the aforementioned object, there is proposed an evaluation method for pneumatic tires which comprises the steps: a step of inputting information of pneumatic tire temperatures sequentially detected for each predetermined time by a temperature sensor into a system and a step of evaluating an adverse effect of a pneumatic tire temperature based on the information, characterized in that the system determines frequencies at which temperatures are detected for each detection temperature and computes a contribution coefficient which is constituted of power function of temperatures and is about change in the states of a tire member previously given using temperatures as parameters and the detected frequencies from a predetermined computing equation, determines a temperature severity number of the pneumatic tire and evaluates an adverse effect caused by tire temperatures using the determined temperature severity number.

The evaluation method for pneumatic tire according to the present invention determines a temperature severity number of a pneumatic tire by substituting a contribution coefficient with temperatures as parameters and detection frequency for each detection temperature into a computing equation and evaluates an adverse effect caused by tire temperatures using the temperature severity number, thus describing tire temperature severity in the form of an objective scale and grasping tire service conditions.

To attain the aforementioned object, there is proposed an evaluation system for pneumatic tires, evaluating an adverse effect of a temperature of a pneumatic tire based on information of temperatures of the pneumatic tire detected by a temperature sensor, characterized by comprising: a temperature detector which includes the temperature sensor and detects temperatures of the pneumatic tire and outputs information of the temperatures; a contribution coefficient storage unit previously storing, for each temperature, contribution coefficients which are constituted of a power function of temperature and are associated with a state change in a tire member with temperatures as parameters; a detection counts calculating unit for calculating a total detection counts of detected temperatures and a count of temperatures detected for each detected temperature based on the detected temperature information; a frequency counting unit for counting temperature detection frequency for each detected temperature using the calculation results of the frequency counting unit; a temperature severity number calculating unit for calculating the contribution coefficients and the detection frequency using a predetermined equation to calculate temperature severity number; and a determination unit for determining an adverse effect of a tire temperature using the calculated temperature severity number.

An evaluation system for pneumatic tires according to the present invention substitutes contribution rates with temperatures as parameters and detection frequencies for each detected temperature into a computing equation to determine a temperature severity number for a pneumatic tire and evaluates an adverse effect of tire temperatures using the temperature severity number, thus expressing tire temperature severity in objective scale for a firm grasp of tire service conditions.

Temperature effects or state changes in a tire member include deterioration, degree of cure of rubber and heat build-up. Tire members include rubber, steel cord and organic fiber cord.

Advantages of the Invention

The evaluation method for pneumatic tires according to the present invention can indicate tire temperature severity in objective scale so as to grasp tire service conditions, thus positively performing tire design for higher precision in tire development and shorter development period.

BRIEF DESCRIPTION OF THE DRAWINGS

FIG. 4 is a view showing zones TSNs according to a first embodiment of the preset invention;

Figure 1:
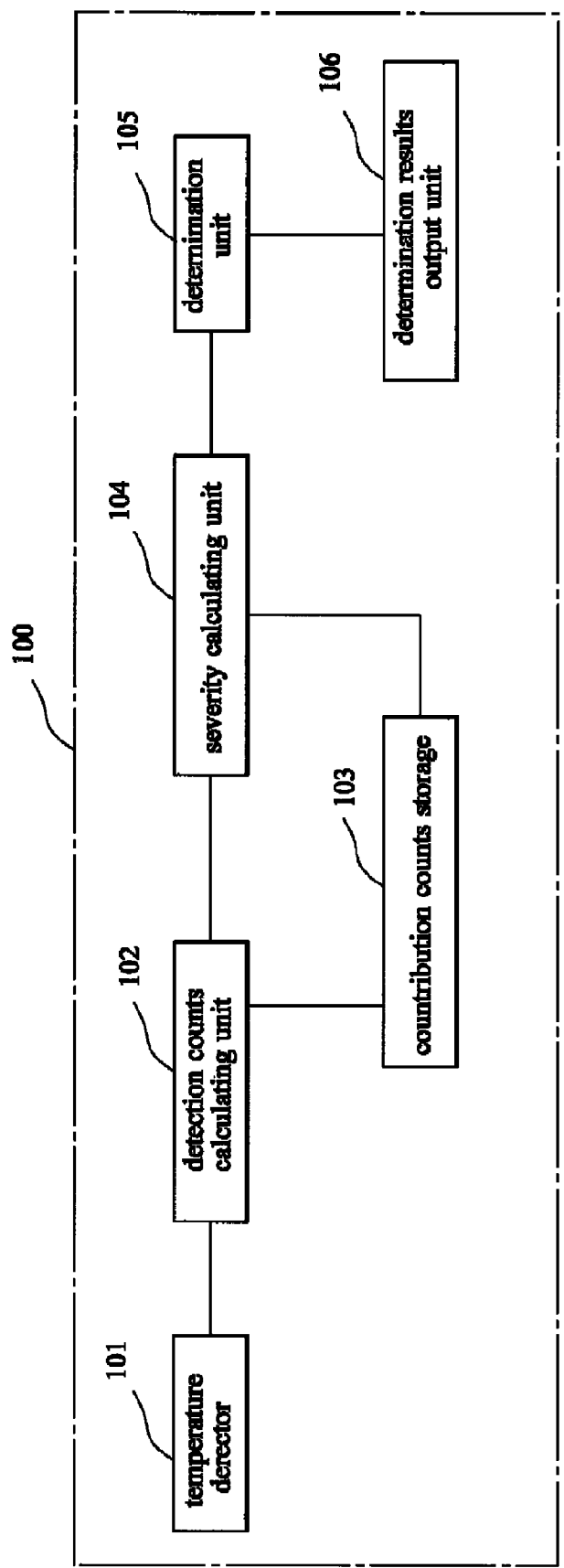
FIG. 1 is a block diagram showing an electric circuit for a temperature-deterioration evaluation apparatus for tires according to a first embodiment of the present invention.

DESCRIPTION OF SYMBOLS 100 thermal-deterioration evaluation apparatus
101 temperature detector
102 detection counts calculating unit
103 contribution coefficient storage unit
104 severity calculating unit
105 determination unit
106 determination result output unit
200 sensor device
210 sensor section
211a air pressure sensor
211b temperature sensor
212a, 212b A/D conversion circuit
220 central processing system
221 CPU
222 D-A conversion circuit
223 storage unit
230 buffer circuit
240 transmission unit
241 oscillation circuit
242 modulation circuit
243 high-frequency amplification circuit
250 antenna
260 battery
300 monitor device
301 antenna
303 receiving unit
305 receiving buffer
306 central processing system
307 memory
308 operation unit
309 switch
310 display controller
311 display unit
312 power supply unit
400 tire

DETAILED DESCRIPTION OF PREFERRED EMBODIMENTS

The present invention will now be described in detail with reference to the drawings showing one embodiment thereof. In this embodiment, an evaluation of a deteriorated state caused by tire rubber temperature will be described as one example.

FIG. 1 is a block diagram showing an electric circuit for a temperature-deterioration evaluation apparatus for tires according to a first embodiment of the present invention. A reference character 100 in FIG. 1 is a thermal-deterioration evaluation apparatus, composed of a temperature detector 101, a detection counts calculating unit 102, a contribution coefficient storage unit 103, a severity calculating unit 104, a determination unit 105 and a determination result output unit 106 in addition to a known computer serving as the heart thereof.

The temperature detector 101 is composed of a temperature sensor attached to a tire to be subjected to thermal deterioration evaluation and a digital output circuit inputting an output signal from the temperature sensor and outputs digital values of detected temperatures at determined time intervals. The temperature sensor measures any of a tire internal temperature, a tire internal air temperature and a tire surface temperature.

The detection counts calculating unit 102 inputs digital values of detected temperatures output from the temperature detector 101. Further, the detection counts calculating unit 102 stores the input digitalized detected temperatures along with detection time information, determines in which of a plurality of zones formed by evenly dividing the portion between upper and lower limits of a detectable temperature range the input digitalized detected temperatures are included, and increases the magnitude of the detection frequency of a corresponding sectional temperature one by one each time a temperature is detected. In this embodiment, 45 temperature zones are defined by evenly dividing a range between 0° C. and 90° C. into 2° C. portions.

Figure 2:
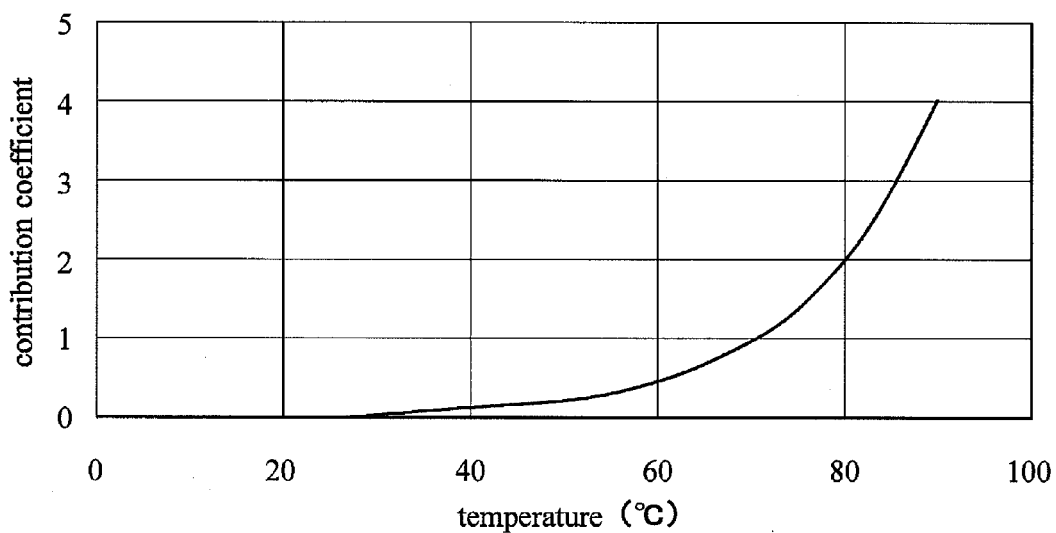
FIG. 2 is a view showing contribution coefficients according to a first embodiment of the present invention.

The contribution coefficient storage unit 103 stores contribution coefficients for the each temperature zone. In this embodiment, assuming that the contribution coefficient is proportional to $e\alpha^T$ based on the known Arrhenius' equation of reaction rate shown in Equation (1), contribution coefficients as shown in FIG. 2 are determined from an experiment and stored in the contribution coefficient storage unit 103. The contribution coefficient shown in FIG. 2 is set so as to be 1 at 70° C.

$$t = Ae^{-E/RT} \tag{1}$$

Where t is a speed constant, A is a constant irrelevant to temperature, E is activation energy, R is a gas constant and T is temperature.

A severity calculating unit 104 calculates a zone temperature severity number, hereinafter referred to as "zone TSN" (TSN: temperature Severity Number) using the following Equation (2) for each temperature zone at every predetermined time, calculates total temperature severity number, hereinafter referred to as "TSN" using the following equation (3), stores these values and updates them in a sequential order.

$$\text{Zone TSN} = T \times n \times k \tag{2}$$

$$\text{TSN} = \Sigma(Ti \times ni \times ki/N) \times \beta \tag{3}$$

Where T, Ti are temperatures, n, ni are detection counts in each temperature zone, k, ki are contribution coefficients, N is a total detection counts, β is a constant irrelevant to temperature and i is a natural number indicating a detection order. The detection frequency (detection rate) is a value obtained by dividing a detection frequency in a corresponding temperature zone by a total detection number. Accordingly, a value of detection frequency varies with elapsed time. As the constant β, preferably, a value between 1/100 and 100 except zero is optionally set. As temperatures T, Ti, a maximum temperature within each temperature zone in this embodiment is used for calculation, but the temperatures are not limited to the maximum temperature.

The determination unit 105 compares a TSN value calculated by the severity calculating unit 104 with a plurality of predetermined threshold values set at predetermined intervals, determines a tire deterioration level from the fact that which one of thresholds has the TSN value, and outputs the determination results.

A determination result output unit 106 inputs the determination result from the determination unit 105 and displays the determination results on a display unit or the like.

First Embodiment

Next, a first embodiment according to the present invention will be described below.

In this embodiment, a one day's deteriorated state of a spare tire attached on a rear surface of a test vehicle was evaluated. In other words, temperatures of the spare tire were measured every ten minutes between 8:30 a.m. and 5:30 p.m. and a deteriorated state of the tire was evaluated from a total temperature severity number determined at 5:30 p.m. based on a deteriorated state of the tire determined at 8:30 a.m.

Figure 3:
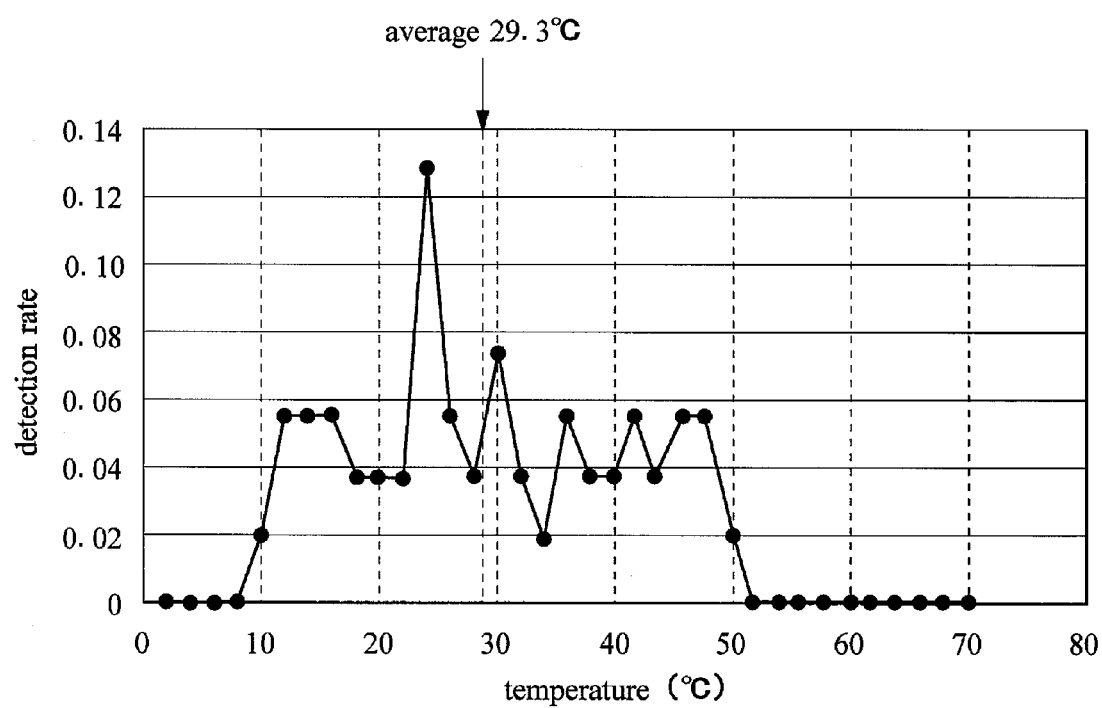
FIG. 3 is a view showing a detection rate of each zone temperature according to one embodiment of the present invention.

FIG. 3 is a graph showing a detection rate (detection frequency) in each temperature zone at that time. FIG. 4 is a chart showing zone TSN and calculation results of TSN. The temperatures in FIG. 4 are indicated with the maximum temperatures in each temperature zone.

As shown in FIGS. 3 and 4, during the driving, detection rates in temperature zones of 2° C. to 8° C. and 52° C. to 90° C. were 0, and detection rates in temperature zones of 10° C. to 50° C. were 0.0185, 0.0556, 0.0556, 0.0556, 0.0370, 0.0370, 0.0370, 0.1296, 0.0556, 0.0370, 0.0741, 0.0870, 0.0185, 0.0556, 0.0370, 0.0370, 0.0556, 0.0370, 0.0556, 0.0556 and 0.0185, respectively.

Contribution coefficients in temperature zones of 10° C. to 50° C. are set to 0.0150, 0.0172, 0.0198, 0.0228, 0.0263, 0.0302, 0.0347, 0.0400, 0.0460, 0.0529, 0.0608, 0.0699, 0.0850, 0.0926, 0.1065, 0.1225, 0.1409, 0.1620, 0.1864, 0.2144 and 0.2466, respectively.

Thus, zone TSNs in temperature zones of 10° C. to 50° C. become 0.00278, 0.01150, 0.01543, 0.02029, 0.01754, 0.02237, 0.02830, 0.12430, 0.06639, 0.05482, 0.13513, 0.08290, 0.05066, 0.18510, 0.14983, 0.18142, 0.32867, 0.26406, 0.47629, 0.57168 and 0.22833, respectively.

In this embodiment, with the constant β set to 1/10 in the computing equation of TSN, the calculated TSN become 0.3018.

In this embodiment, a deterioration level is determined with a value of TSN×total detection counts N, a deteriorated state of tire rubber is evaluated, and higher deterioration level is determined as deterioration of tire rubber accelerating more increasingly. Furthermore, multiplication of a value of TSN× total detection counts N by M makes it possible to determine a deterioration level which would reach after a period of M times as large as a measurement time.

As described above, in this embodiment, contribution coefficients with temperatures as parameters and detection rates (detection frequencies) for each detected temperature are substituting into the computing equation to determine a temperature severity number for a pneumatic tire and thermal deterioration of the tire is evaluated using the temperature severity number, by which temperature severity of the tire can be expressed in objective scale to grasp the usage conditions of the tire. This makes it possible to perform positive tire design, thus enhancing tire development accuracy and shortening development time.

A key factor of a conventional deterioration and durability test method for pneumatic tires is tire temperature and, if the severity of the temperature is not quantitatively and conveniently indicated, tire design or a tire service condition (environment) will be difficult to grasp comparatively and objectively. However, the values determined in the above-described embodiment can be used in a variety of scenes as temperature severity, and deterioration caused by temperatures of tire rubber can be appropriately evaluated by quantitatively and conveniently indicating the severity of temperatures imposed on tire rubber. Accordingly, needless to say, the deterioration evaluation by this embodiment leads to optimization of design and quantification of tire service conditions, thus providing use in more effective tire development.

Moreover, such temperature zones and thresholds as shown in the abovementioned embodiment are examples, but are not limited to those in the embodiment.

Furthermore, in the abovementioned embodiment, a deteriorated state of tire rubber was evaluated, but deterioration evaluation is not limited to this. The embodiment makes it possible to evaluate an adverse effect of degree of cure of rubber or temperature at heat build-up as well. In addition, needless to say, an adverse effect of temperature of steel cord or organic fiber cord as tire components made of material except rubber can be evaluated.

Second Embodiment

Next, a second embodiment according to the present invention will be described below.

Figure 5:
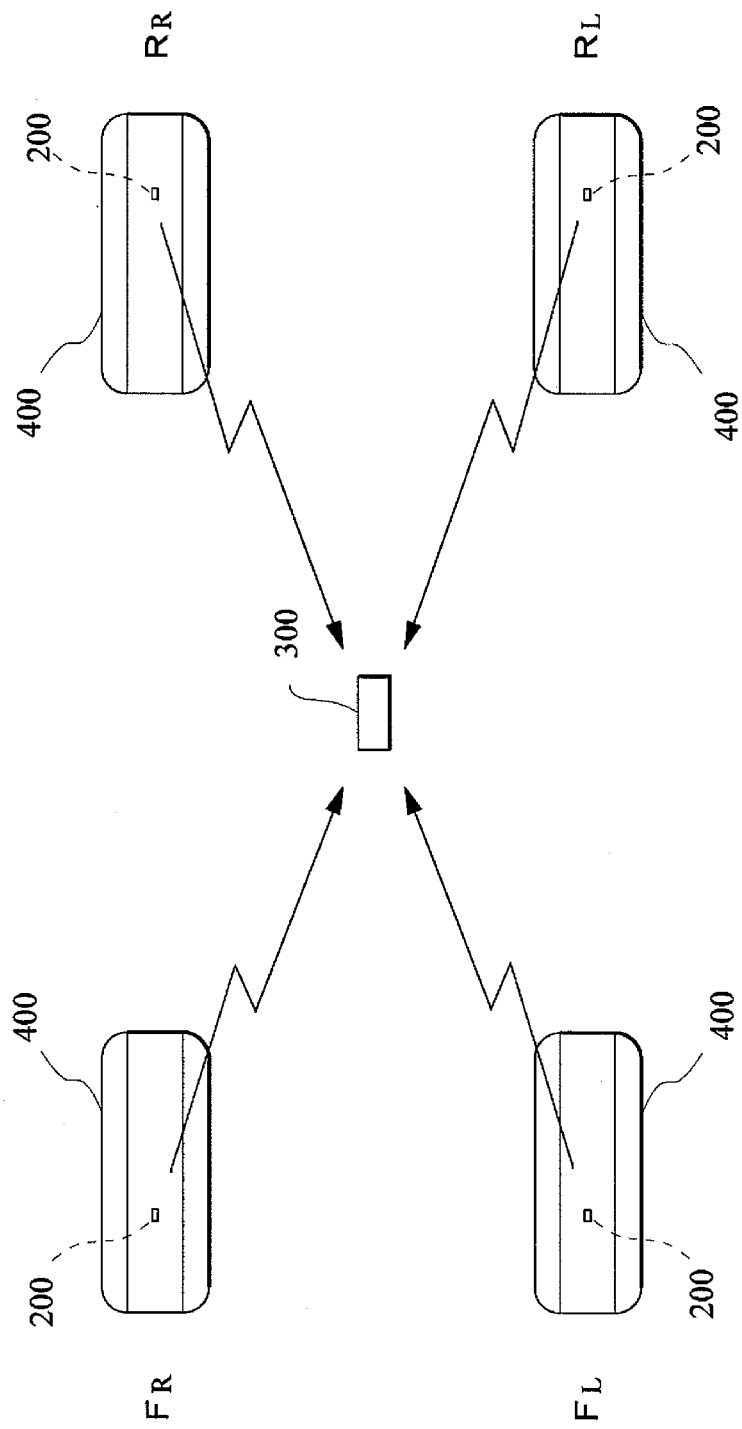
FIG. 5 is a view showing the whole configuration of a tire monitoring system according to a second embodiment of the present invention.
Figure 6:
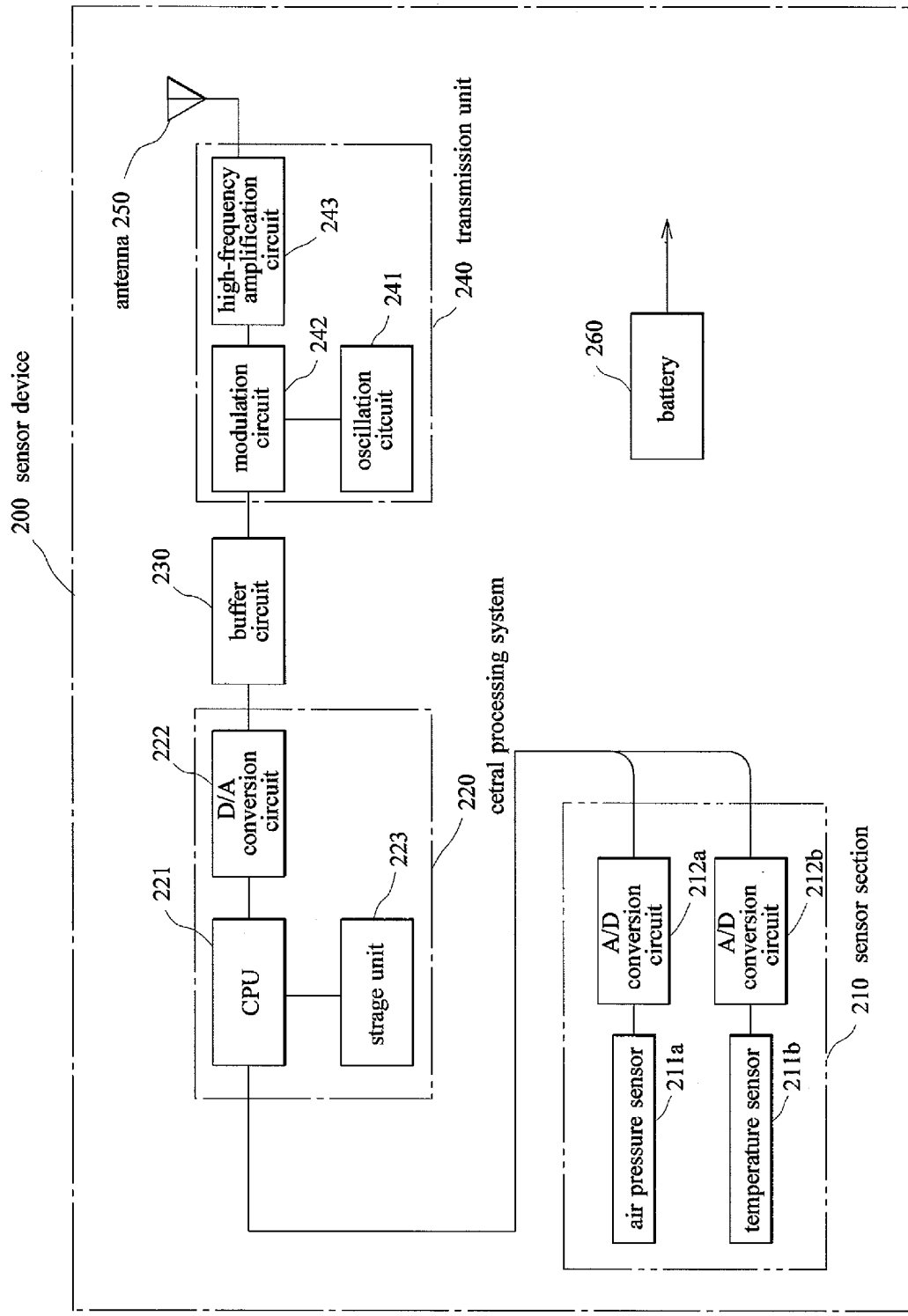
FIG. 6 is a block diagram showing an electric circuit of a sensor device according to a second embodiment of the present invention.
Figure 7:
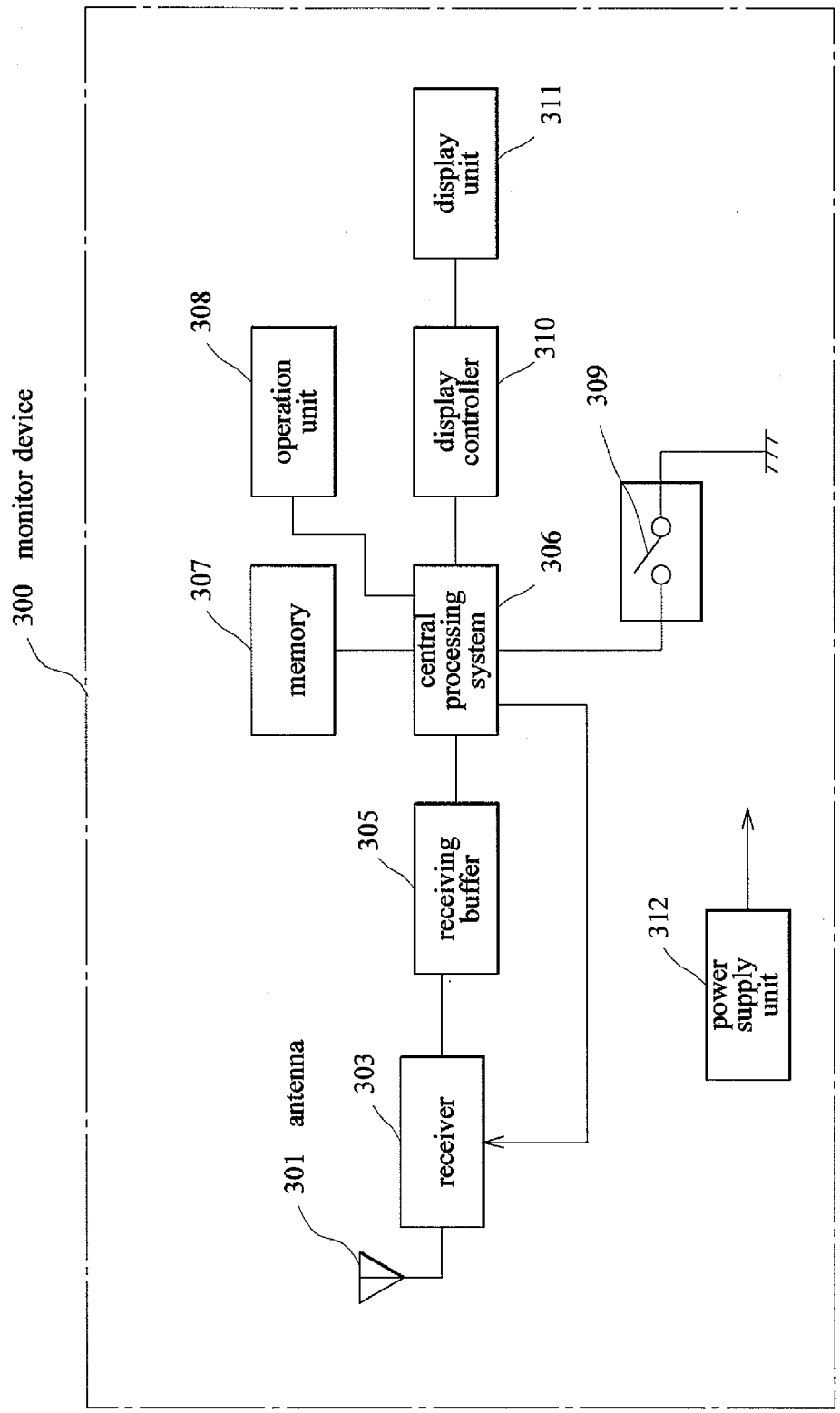
FIG. 7 is a block diagram showing an electric circuit of a monitor device according to a second embodiment of the present invention.

FIG. 5 is a view showing the whole configuration of a tire monitoring system according to a second embodiment of the present invention, FIG. 6 is a block diagram showing an electric circuit of a sensor device according to a second embodiment of the present invention and FIG. 7 is a block diagram showing an electric circuit of a monitor device according to a second embodiment of the present invention. The tire monitoring system according to this embodiment is provided with the thermal-deterioration evaluation apparatus for tires according to the first embodiment described above, and the thermal-deterioration evaluation apparatus 100 for tires according to the first embodiment is constituted of a program of a central processing system 206 in a monitor device 200 described later.

In these figures, a reference character 200 denotes a sensor device, a reference character 300 denotes a monitor device and a reference character 400 denotes a tire mounted on a vehicle.

The sensor device 200 is installed inside the tire 400, and detects air pressure in the tire 400 and wirelessly transmits the detection results to the monitor device 300.

As shown in FIG. 6, an electric circuit for the sensor device 200 is composed of a sensor section 210, a central processing system 220, a buffer circuit 230, a transmission unit 240, an antenna 250 and a battery 260.

The sensor section 210 is constituted of a pneumatic sensor 211a, a temperature sensor 211b and A/D conversion circuits 212a, 212b.

The pneumatic sensor 211a detects a pressure of air with which the tire 400 is filled and outputs the detection result as an analog electric signal. As the pneumatic sensor 211a, a commercially available device may be used.

The temperature sensor 211b detects a temperature in the tire 400 and outputs the detection result as an analog signal.

The A/D conversion circuit 212a converts an analog electric signal output from the pneumatic sensor 211a into a digital signal and outputs the digital signal to a CPU 221. The digital signal corresponds to a value of an air pressure in the tire 400.

The A/D conversion circuit 212b converts an analog electric signal output from the temperature sensor 211b into a digital signal and outputs the digital signal to the CPU 221. The digital signal corresponds to a value of a temperature in the tire 400.

The central processing system 220 is constituted of the known CPU 221, a digital-analog, hereinafter referred to as "D-A" conversion circuit 222 and a storage unit 223.

The CPU 221 operates based on a program stored in a semiconductor memory of the storage unit 223 and, when driven by electric energy, transmits detection data by the sensor 210 to the monitor device 300 at every predetermined time (e.g. 5 minutes). Moreover, identification information unique to the sensor device 200 is previously stored in the storage unit 223 and the CPU 221 transmits the identification information to the monitor device 300 along with detection data.

The storage unit 223 is composed of a ROM recording a program for operating the CPU 221 and an electrically rewritable nonvolatile semiconductor memory such as EEPROM (electrically erasable programmable read-only memory). Moreover, the identification information unique to individual sensor devices 200, hereinafter referred to as a "sensor device ID", is previously stored in a region designated so as not to be rewritable in the storage unit 223 in the course of production.

The buffer circuit 230 is constituted of a memory circuit using FIFO or the like, and temporarily stores binary serial transmission data output from the D-A conversion circuit 222 and outputs the data to the transmission unit 240.

The transmission unit 240 is composed of an oscillation circuit 241, a modulation circuit 242 and a high-frequency amplification circuit 248, and modulates a carrier wave produced with a known PLL circuit or the like and oscillated by the oscillation circuit 241, for example, a carrier wave of a frequency of 315 MHz band, with a modulation circuit 242 based on transmission data input from the buffer circuit 230 and supplies the modulated carrier wave to an antenna 250 as a high-frequency current of a frequency of 315 MHz through a high-frequency amplification circuit 243.

The modulation circuit 242 modulates a carrier wave based on transmission data input from the buffer circuit 230 and outputs the modulated wave to the high-frequency amplification circuit 243.

In this embodiment, the frequency is set to a frequency of 315 MHz band, however, a different frequency from the above one may be used. The modulation system in the modulation circuit 242 is not particularly limited, and a modulation system such as amplitude modulation (AM modulation), amplitude shift keying modulation (ASK), frequency modulation (FM), frequency shift keying modulation (FSK), phase modulation (PM) and phase shift keying modulation (PSK) may be used.

The antenna 250 communicates with the monitor device 300 using electromagnetic waves and, in this embodiment, is matched with a predetermined frequency of 315 MHz band.

The battery 260, constituted of secondary cells or the like, supplies electric energy required to drive the sensor device 200 to each portion.

To embed the sensor device 200 into the tire 400 in producing the tire 400, needless to say, IC chips and other components are designed so as to resist curing heat.

The monitor 300, disposed near a driver's seat in a vehicle, is composed of an antenna 301, a receiver 303, a receiving buffer 305, a central processing system 306, a memory 307, an operation unit 308, a switch 309, a display controller 310, a display unit 311 and a power supply unit 312, as shown in FIG. 7.

The antenna 301 is matched with the same frequency as a transmission frequency of the sensor device 200 and is connected to the input side of the receiver 303.

The receiver 303 receives electromagnetic waves of a modulated predetermined frequency through the antenna 301, modulates received signals to be converted into binary serial digital data and outputs the received data to the receiving buffer 305. Moreover, the receiver 303 can scan received frequencies in a predetermined range, based on control signals from the central processing system 306, and can lock the received frequencies to any given frequency in the predetermined range. Needless to say, the receiver 303 includes a frequency of 315 MHz band as a receivable frequency band. A demodulation system in the receiver 303 can be switched based on a control signal from the central processing system 306.

The receiving buffer 305 temporarily stores serial digital data output from the receiver 303 and outputs the digital data to the central processing system 306 according to an instruction from the central processing system 306.

The central processing system 306 is a known computer and mainly constituted of a known CPU, and operates based on a program stored in a memory 307. The program constitutes the thermal-deterioration evaluation apparatus 100 in the first embodiment described above.

The central processing system 306, when driven by supplied electric energy, analyzes detection data received from the sensor device 200, displays the analysis data on the display unit 311 through the display controller 310, performs tire evaluation as described for the first embodiment using tire temperature data and, if temperature severity number TNS is above a predetermined value, issues an alarm through the display unit 311 as tire deterioration beyond a specified value. That is, the thermal-deterioration evaluation apparatus provided on the system in this embodiment issues an alarm if a tire is deteriorated.

The central processing system 306 inputs information and signals from the operation unit 308 and the switch 309, initializes a communication system to the sensor device 200, and performs communications with the each sensor 200 using the initialized communication system.

The memory 307 is composed of a ROM on which a program for operating a CPU of the central processing system 306 is recorded and a nonvolatile semiconductor memory electrically rewritable such as EEPROM (electrically erasable programmable read-only memory).

The operation unit 308 includes a keyboard constituted of, for example, a plurality of switches and inputs information for initializing and ID or the like of the sensor device 200.

The switch 309 provides an instruction of initialization start to the central processing system 306.

The display controller 310 displays on the display unit 311 values of air pressures in each of the tires 400 according to mounting positions of each of the tires 400, based on data input from the central processing system 306.

The power supply unit 312 receives power supply from the battery mounted on the vehicle, converts the supplied power into voltage values suited to each portion constituting the monitor device 300 and supply the voltages to each portion.

The tire monitoring system, provided with the thermal-deterioration evaluation apparatus 100, detects a tire air pressure, monitors the detected air pressure with the monitor device 300, determines a deterioration level with a value of TSN×total detection frequency N, evaluates a deteriorated state of tire rubber, determines higher deterioration level as tire rubber accelerating more increasingly and, if the deterioration level is beyond a predetermined threshold, issues an alarm, thus always monitoring a deteriorated state of the tire 400 mounted on the vehicle and timely informing a driver of tire replacement time.

INDUSTRIAL APPLICABILITY

Detection frequencies are calculated for each detected temperature based on information of temperatures of pneumatic tires detected by a temperature sensor. Temperature severity numbers of the pneumatic tires are calculated based on the detection frequencies and contribution coefficients of deterioration of tire rubber with temperatures as parameters and thermal deterioration of the tires is evaluated using the calculated temperature severity number. This makes it possible to appropriately evaluate an adverse effect such as deterioration of tire temperatures by expressing severity of temperatures imposed on tire members made of rubber or the like in quantitative and convenient manners.

What is claimed is:

1. An evaluation method for pneumatic tires which comprises the steps: a step of inputting information of pneumatic tire temperatures sequentially detected for each predetermined time by a temperature sensor into a system and a step of making the system evaluate an adverse effect of the pneumatic tire temperatures based on the information, characterized in that the system performs the following operations:
determining a total detection counts N of detected temperatures and a count $n_i$ of temperatures detected for each detected temperature $T_i$;
substituting a contribution coefficient $k_i$ which is constituted of power function of temperatures and is associated with a state change in a tire member previously given using temperatures as parameters and a rate $\beta$ into a computing equation $TSN=\Sigma(T_i \times n_i \times k_i/N) \times \beta$ to calculate a temperature severity number TSN of the pneumatic tire; and
evaluating an adverse effect of a tire temperature using the calculated temperature severity number TSN.

2. The evaluation method for pneumatic tires according to claim 1, characterized in that the contribution coefficient $k_i$ constituted of power function of temperatures is a rate set based on the Arrhenius' equation of reaction rate.

3. The evaluation method for pneumatic tires according to claim 2, characterized in that the adverse effect of a temperature is deterioration and the state change in a tire member is deterioration of the tire member.

4. The evaluation method for pneumatic tires according to claim 3, characterized in that a value between 1/100 and 100 inclusive except 0 is used as the rate $\beta$.

5. The evaluation method for pneumatic tires according to claim 3, characterized in that a detectable temperature range is divided into a plurality of temperature zones, the contribution coefficient $k_i$ is previously set for each temperature zone, and the contribution coefficient $k_i$ corresponding to a temperature zone relative to a detected temperature $T_i$ in a predetermined temperature zone is used for the calculation.

6. The evaluation method for pneumatic tires according to claim 1, characterized in that the adverse effect of a temperature is deterioration and the state change in a tire member is deterioration of the tire member.

7. The evaluation method for pneumatic tires according to claim 6, characterized in that a value between 1/100 and 100 inclusive except 0 is used as the rate $\beta$.

8. The evaluation method for pneumatic tires according to claim 6, characterized in that a detectable temperature range is divided into a plurality of temperature zones, the contribution coefficient $k_i$ is previously set for each temperature zone, and the contribution coefficient $k_i$ corresponding to a temperature zone relative to a detected temperature $T_i$ in a predetermined temperature zone is used for the calculation.

9. An evaluation system for pneumatic tires, evaluating an adverse effect of a temperature of a pneumatic tire based on information of temperatures of the pneumatic tire detected by a temperature sensor, characterized by comprising:
temperature detection means which include the temperature sensor, detect temperatures $T_i$ of the pneumatic tire and output information of the temperatures;
contribution coefficient storage means previously storing, for each temperature $T_i$, contribution coefficients $k_i$ which are constituted of a power function and are associated with a state change in a tire member with temperatures as parameters;
detection counts calculating means for calculating a count $n_i$ of temperatures detected for each detected temperature $T_i$ and a total detection counts N of detected temperatures based on the detected temperature information;
temperature severity number calculating means of substituting the total detection counts N, the count $n_i$ of temperatures detected, the contribution coefficient $k_i$ and the rate $\beta$ into a computing equation $TSN=\Sigma(T_i \times n_i \times k_i/N) \times \beta$ to calculate a temperature severity number TSN of the pneumatic tire; and determination means of determining an adverse effect of a tire temperature using the calculated temperature severity number TSN.

10. The evaluation system for pneumatic tires according to claim 9, characterized in that the contribution coefficient $k_i$ constituted of power function of temperatures is a rate set based on the Arrhenius' equation of reaction rate.

11. The evaluation system for pneumatic tires according to claim 10, characterized in that the adverse effect of a temperature is deterioration and the state change in a tire member is deterioration of the tire member.

12. The evaluation system for pneumatic tires according to claim 11, characterized in that a value between 1/100 and 100 inclusive except 0 is used as the rate $\beta$.

13. The evaluation system for pneumatic tires according to claim 11, characterized in that the contribution coefficient storage means have the contribution coefficient ki previously set for each of a plurality of temperature zones obtained by dividing a detectable temperature range, and that temperature severity number calculating means performs the calculation using a contribution coefficient ki corresponding to a temperature zone relative to a detected temperature Ti in a predetermined temperature zone.

14. The evaluation system for pneumatic tires according to claim 11, characterized in that the temperature detection means measure any of a tire internal temperature, a tire internal air temperature and a tire surface temperature with the temperature sensor.

15. The evaluation system for pneumatic tires according to claim 11, characterized by including alarm means of, if the temperature severity number TSN is above a predetermined value, determining tire deterioration to be above a specified value, and issuing an alarm.

* * * * *